United States Patent [19]

Demmer et al.

[11] Patent Number: 5,547,575
[45] Date of Patent: Aug. 20, 1996

[54] METHOD FOR THE SURFACE MODIFICATION OF FORMED BODIES AND FORMED BODIES PRODUCED THEREBY

[75] Inventors: Wolfgang Demmer, Göttingen; Hans-Heinrich Hörl, Bovenden; Dietmar Nussbaumer, Göttingen; Abdul R. Weiss, Göttingen; Eberhard Wünn, Göttingen-Nikolausberg, all of Germany

[73] Assignee: Sartorius AG, Gottingen, Germany

[21] Appl. No.: 364,394

[22] Filed: Dec. 23, 1994

Related U.S. Application Data

[63] Continuation of Ser. No. 945,638, filed as PCT/EP92/00501, Mar. 6, 1992, published as WO92/15637, Sep. 17, 1992, abandoned.

[30] Foreign Application Priority Data

Mar. 6, 1991 [DE] Germany .................. P 41 07 171.9

[51] Int. Cl.$^6$ .................................. B01D 67/00
[52] U.S. Cl. .............. 210/490; 210/500.35; 210/500.42; 427/245
[58] Field of Search ................... 210/490, 500.35, 210/500.37, 500.42, 508; 264/22, 41; 427/244, 245, 246

[56] References Cited

U.S. PATENT DOCUMENTS

| | | | |
|---|---|---|---|
| 3,083,118 | 3/1963 | Bridgeford | ................................ 117/47 |
| 4,690,766 | 9/1987 | Linder et al. | .................. 210/500.37 X |
| 4,944,879 | 7/1990 | Steuck | ................. 210/500.27 |
| 4,976,861 | 12/1990 | Pall | ........................ 210/508 |

*Primary Examiner*—Frank Spear
*Attorney, Agent, or Firm*—Chernoff, Vilhauer, McClung & Stenzel

[57] ABSTRACT

Fabrication of the surface-grafted microporous membranes by coating the membrane with an N-halogenated compound, followed by grafting with an unsaturated monomer and sodium dithionite in a primarily aqueous solution that may contain an organic halogen compound selected from carbon tetrachloride and trichloroacetic acid. The coating may be formed in situ and may be cross-linked.

13 Claims, No Drawings

METHOD FOR THE SURFACE MODIFICATION OF FORMED BODIES AND FORMED BODIES PRODUCED THEREBY

This application is a continuation of application Ser. No. 07/945,638, filed as PCT/EP92/00501, Mar. 6, 1992, published as WO92/15637, Sep. 17, 1992, now abandoned.

The invention relates to a method for the surface modification of formed bodies such as polymeric membranes. The invention further relates to such grafted membranes and to their use for adsorptive mass transfer.

BACKGROUND OF THE INVENTION

According to a known and widespread grafting method, radical groups are introduced into the chain of a base polymer, e.g., with the aid of high energy radiation, which causes grafting by free radical chain polymerization.

However, the use of radiation-induced grafting for the surface modification of formed bodies according to known methods not only requires the use of expensive apparatus but also has disadvantages in the quality of the products obtained. The effects of both the radiation and the grafting cannot be limited to the surface of the formed body. When grafting also occurs in the interior of the formed body, both the polymer's dimensions and its bulk properties change.

Other methods of graft copolymerization are based on activation under radical formation by means of strong oxidizing agents such as the grafting onto cellulose or polyamides in the presence of $Ce^{IV}$ salts. This method can only be used at very low pH, namely, at pH<2, because a hydrolytic precipitation of the $Ce^{IV}$ salt otherwise occurs; at the same time there is the danger of a hydrolytic degradation of the polymer at such low pH. Moreover, even in this method the grafting cannot be limited to the surface of the polymer.

Still other methods of graft polymerization are based on chain transfer with homopolymerization of the monomer being induced by a radical initiator in the presence of the base polymer to be grafted, in which instances high temperatures must be used as a rule in order to effect the decomposition of the initiator. In addition to the requirement of high temperatures, a further disadvantage of this method is the fact that basically only a part of the monomer used becomes active for the grafting, leaving the remainder to accumulate as homopolymer. As a result, not only is the yield reduced, but it is also necessary to separate homopolymer from the grafted body.

It is also known that polyamides can be grafted with acrylamide or acrylonitrile as monomers in such a manner that in a first step the hydrogen atoms on the nitrogen atoms are replaced by chlorine atoms. The halogen-substituted polyamides are then converted by hydrazine or $Fe^{II}$ salts back into the initial polymer, during which a radical transitional state appears on the nitrogen. In the presence of monomeric acrylamide or acrylonitrile a radical chain polymerization takes place on the nitrogen atom in the same manner as in other redox-initiated polymerization methods. This reaction is described, e.g., by K. V. Phung and R. C. Schulz in *Makromolekulare Chemie*, pages 1800–1825 (1979), and was used to demonstrate the above-mentioned radical transitional state during the reduction.

Another work which deals with the grafting on N-halogenated polyamides described the initiation by metalcarbonyls. See C. H. Bamford, et al. in *J. Polym. Sci.*, part C, pages 419–432 (1968). The last-mentioned process for grafting following chlorination of the base polymer is also used for surface grafting of nitrogen-containing membranes and in particular microporous membranes with the nitrogen on the polymers containing a hydrogen atom substitutable by halogens (cf. WO 91/03310 and EP-A-90 913 482.7, as well as DE-A1-39 29 648.2). A similar method is also used for the surface grafting of formed bodies from such polymers, wherein the chlorination of the polymer does not occur but the grafting is carried out in the presence of carbon tetrachloride (cf. WO 91/03506 and EP-A-90 913 193.0, as well as DE-A1-39 29 647.4). The disadvantages of these two grafting methods are that they can only be used with a certain class of base polymers and they require careful monitoring of the grafting process in order to limit the grafting to the surface of the base polymer.

The object of the present invention is to provide novel grafted formed bodies and a method of grafting on formed bodies of any desired polymer, which method is simple to carry out while avoiding grafting in the interior of the formed-body polymer, even when grafting on large amounts of a graft polymer. It is also an object of the invention to avoid disadvantageous changes in the dimensions and bulk properties of the formed-body polymer.

SUMMARY OF THE INVENTION

According to the invention a layer of a second polymer is first applied either directly onto the surface of a formed body comprising a first polymer or, in a preferred embodiment, by applying the second polymer's precursors and converting the precursors to the second polymer; followed by grafting onto the layer of the second polymer by formation of a layer of a third polymer of ethylenically unsaturated monomers. The invention makes it possible to limit the grafting onto the layer of the second polymer without the first polymer experiencing a disadvantageous change due to inclusion of graft polymer. The grafting in the interior of the first polymer is avoided in that grafting is performed under conditions under which a grafting on the first polymer cannot occur on account of its chemical structure.

DETAILED DESCRIPTION OF THE INVENTION

The method of the invention can be used in principle for any type of polymeric formed body wherein the surface properties need to be different from the body's bulk properties. The most important surface properties which can be influenced by the modification are the wettability, the adsorption behavior and the chemical reactivity.

The use of the grafted formed bodies of the invention for methods of mass transfer operating according to the principle of filtration or adsorption is of special significance. In these instances the formed bodies are designed as fabrics, matted material, microporous membranes or other porous materials such as open-cell foams. Microporous membranes are divided into microfiltration membranes and ultrafiltration membranes; the former are in a pore size range between 0.05 and 15 µm and the latter are characterized by their retention capacity for proteins of various molecular weights in a range approximately between 5000 and 1,000,000 daltons.

Selection of the First Polymer

The first polymer is selected on the basis of the desired mechanical and chemical properties of the formed body. All conventional polymers can be considered. These include cellulose and its derivatives (cellulose hydrate, -acetate, -nitrate and their mixtures), polyolefins (especially polypropylene), polysulfones, polyethersulfones, aromatic and aliphatic polyamides, polysulfonamides, halogenated polymers such as polyvinyl chloride, polyvinyl fluoride, polyvinylidene fluoride and polytetrafluoroethylene, polyesters as well as homo- and copolymers of acrylonitrile.

It is important for the selection of the first polymer that it undergoes essentially no matrix grafting. This condition is met when no grafting can be determined gravimetrically on the formed body under grafting conditions without application of the second polymer.

Formation of the Layer of the Second Polymer

The application of the second polymer onto the formed body is of special significance for the method of the invention, especially in the case of microporous formed bodies such as ultrafiltration and microfiltration membranes, because the thickness and the uniformity of this polymer layer determine the properties of the end product. The applied layer must, in the case of microporous membranes, generally completely cover the entire interior surfaces, that is, the pore walls, yet not produce a clogging of the pores.

However, it is also possible according to the invention to limit grafting to a specific portion of the formed body by coating only such a portion with the second polymer. This variation is useful in the case of asymmetric ultrafiltration membranes by coating only the "skinned" layer coming in contact with protein during filtration, and subsequently grafting this layer in order to reduce the protein adsorption.

The simplest possibility, which can also be used in may instances, is that the formed body is moistened with a solution of the second polymer followed by evaporation of the solvent. If the surface of the formed body cannot be moistened by the intended solvent, especially in the case of solvents with a high surface tension such as water or formic acid, the addition of a surfactant may be necessary. However, the use of non-solvents with a low surface tension such as alcohols is also possible as long as its concentration remains below that which would precipitate the second polymer.

In the case of microporous formed bodies an accumulation of the second polymer can occur on the walls of the smallest diameter pores because during the evaporation of the solvent the remaining solution is drawn into the smallest pores by capillarity, which can adversely affect the uniformity of the coating.

If this effect becomes noticeable, it is more advantageous to apply the second polymer by means of adsorption. Such an application method is especially important in the case of ultrafiltration membranes wherein a complete drying out would destroy the membrane. Such membranes are usually stored either wet or with a certain minimum content of a difficulty volatile liquid, usually glycerol, in order to avoid the loss of their hydraulic permeability, which would otherwise occur.

To apply the second polymer by adsorption, a solution thereof is simply brought into contact with the surface of the formed body for a sufficiently long time to allow adsorption of the dissolved second polymer on the surface of the formed body, followed by removal of the second polymer by washing. Times from 30 seconds to 30 minutes, preferably from 1 to 5 minutes, are used for the adsorption. In this manner, especially uniform layers of the second polymer can be produced.

In the case of ultrafiltration membranes which are already impregnated with a liquid, this liquid is preferably displaced in a first step by the solvent provided for the second polymer; the solvent and the impregnating agent are preferably miscible with one another and the contact with the solution of the second polymer is not brought about until subsequently.

Even though the extent of the adsorption of the second polymer on the first cannot be exactly predicted and so a certain measure of empiricism is therefore necessary, especially with respect to selection of the most suitable solvent, a few qualitative statements are nevertheless possible. It can be taken as a rule of thumb that the adsorption is favored by a solvent or solvent mixture which exhibits a relatively slight solvent power for the second polymer. Also, opposite electric charges of the first and of the second polymers, even if slight, or hydrophobicity of both polymers is helpful in further adsorption of the second polymer onto the first.

The second polymer must not be used as such for coating the surface of the formed body. A preferred embodiment of the invention utilizes precursors of the second polymer to react on the surface of the formed body upon polymerization.

The precursors of the second polymer can be applied from both the liquid phase and the gaseous phase onto the surface of the formed body. In the case of the former, the individual components can be applied either simultaneously in a mixture (preferably diluted with a solvent), optionally with the addition of a catalyst effecting the polymerization reaction, or one at a time; of these two, the simultaneous application method is generally preferred.

An especially advantageous way of applying the precursors of the second polymer onto the surface of the formed body is by adsorption out of the gaseous phase. In this instance the formed body to be provided with the layer is successively exposed to atmospheres which exhibit a certain partial pressure of the particular component. The advantage of this approach is that the precursors of the second polymer, which are reactive with one another, do not come in contact with one another until on the surface of the formed body and thus cannot react prematurely with one another. Moreover, it is not necessary when using gaseous phases to provide a solvent evaporation step.

The reaction of the precursors to the second polymer on the surface of the formed body can take place either spontaneously or in a time reaction or can be initiated by an elevation of temperature.

When using a second polymer containing reactive chemical groups which are capable of forming covalent bonds to the first polymer, a covalent bond between the first and the second polymer can be produced. It is also possible to convert the second polymer by means of cross-linking into an insoluble state.

The grafting is frequently also accompanied by a cross-linking of the second polymer, which is inferred from the fact that the grafted-on third polymer can in general no longer be removed by a solvent that is common to the second and third polymer. The third polymer is generally not removed even under conditions which normally result in a degradation of the second polymer. Thus, for example, the grafting remains preserved even when an aliphatic polyamide is used as the second polymer and the grafted formed body is treated with hot sulfuric acid. Under these conditions non-cross-linked polyamide would be degraded hydrolytically in a very short time.

Preferred Grafting Methods

The method of the invention is basically suitable for any combination of a first and of a second polymer for which a grafting method is available which is selective to the second polymer.

Among the grafting methods mentioned in the Background section above, according to the invention, those two methods are preferred which make possible the grafting of ethylenically unsaturated monomers onto nitrogen-containing polymers in the presence of reducing agents, in which instances the nitrogen on the polymers include a hydrogen atom substitutable by halogens. In these preferred grafting methods the nitrogen-containing polymers to be characterized in more detail are applied as the second polymer onto the formed body.

The characteristic of the first of these methods is that the hydrogen atoms located on the nitrogen are replaced by halogen before the grafting, preferably by chlorine or bromine, and that the grafting is carried out in the presence of at least one ethylenically unsaturated monomer and of a reducing agent. The grafting is therefore initiated by radical formation on the nitrogen.

In the second method, instead of the halogenation of the second polymer, carbon tetrachloride or another organic halogen compound, e.g., trichloroacetic acid, is added during the grafting.

Selection of the Second Polymer

The preferred second polymers for the above-mentioned grafting methods are, e.g., aromatic and aliphatic polyamides, polysulfonamides, polyurethanes and polyureas. Among the aliphatic polyamides both those soluble in alcohol and those insoluble in alcohol can be considered.

If the second polymer is applied by means of coating from a solvent, all commercial aliphatic polyamides can be considered and either formic acid or alcohol/water mixtures are used as preferred solvents, depending on the solubility of the polyamide therein.

In the case of polyamides which are insoluble in alcohol such as nylon 46, nylon 6, nylon 66, nylon 610, nylon 11 and nylon 12, a solvent with low surface tension to the formic acid is used to lower the surface tension. Preferred solvents with a low surface tension are alcohols and ketones. Thus, for example, an addition of ethanol of 5 to 30% by weight, preferably of 10 to 20% relative to formic acid can be used. (In all cases, unless otherwise specified, the "%" symbol is used to indicate percent by weight.)

The polyamides soluble in alcohol such as Ultramid 1 C (Bayer or Evamid 8061/DuPont) are applied from solutions in alcohol-water mixtures, e.g., from a solution in 60 to 90%, preferably 70 to 80% ethanol.

According to one embodiment of the invention the second polymer is cross-linked. This can take place, e.g., by means of aldehydes, preferably formaldehyde or by diisocyanates. The addition of the cross-linking agent can take place both in common with the polymer in the solution and also after the application of the second polymer, either from a solution of the cross-linking agent or via the gaseous phase. The latter route is preferred in the case of cross-linking with formaldehyde, in which instance a catalyst required for the cross-linking, e.g., an organic acid such as oxalic acid or citric acid, is added, if necessary, to the polymer solution in a concentration of 0.5 to 2% relative to the second polymer, preferably 1 to 1.5% and a treatment with formaldehyde vapors then takes place, followed by heating to 100° to 160° C., preferably 120° to 140° C. The heating lasts 10 seconds to 15 minutes, preferably 30 seconds 5 minutes, depending on the temperature used. In order to assure short treatment times in the interest of higher production rates, high treatment temperatures are preferred; however, in practice, the upper limit is given by the thermal resistance both of the first and of the second polymer.

An especially preferred embodiment of the application of a cross-linked polyamide layer as second polymer comprises the application of a fully or partially hydroxy- or methoxy-methylated polyamide is applied from a solution also containing the acidic catalyst and then the cross-linking is carried out by means of the thermal step described above. The hydroxy- or methoxy-methylated polyamides are entirely soluble in alcohol and are therefore applied with preference from alcoholic solutions. An example for such a commercially available product is Nylon 8 T-8E (Unitika Co., Ltd., Japan), a methoxy-methylated nylon 6.

Although aromatic polyamides such as Nomex® or Kevlar® (DuPont) can also basically be applied from solutions, the formation of the polymer in situ is preferred in these instances on account of the limited solubility of the aromatic polyamides. This also applies to certain aliphatic polyamides such as those based on oxalic acid, the polyurethanes and polyureas. The in situ formation of the second polymer is described further below.

Not only those polyamides which are customarily used as materials of construction can be considered as the second polymer but also those which are used for other purposes such as the polyamide resins and polyamide-based hot-melt adhesives. An example of the latter group is Macromelt® 6238 (Henkel). An especially high grafting tendency was determined for this product in comparison to other polyamides, which indicates that an especially high density of NH groups is present.

If, between the two preferred grafting methods, the one is selected wherein the first step comprises an N-halogenation of the second polymer, the process can be simplified by applying the second polymer in halogenated form already. It is known that nylon 6 and nylon 66 can be quantitatively N-chlorinated by means of conversion with inorganic or organic hypochlorites and that the corresponding N-chloropolyamides are soluble both in formic acid and in aromatic solvents such as toluene and benzene as well as in halogenated hydrocarbons such as chloroform and tetrachloroethane. In the case of partial chlorination the N-chloropolyamides are soluble only in formic acid. Both the fully halogenated and the partially halogenated polyamides can be applied as the second polymer, followed by the grafting without a further halogenation step.

In situ Formation of the Second Polymer Layer

A layer of polyamides, especially aromatic polyamides, can be formed in situ by means of the conversion of dicarboxylic acid dihalides such as terephthalic acid dichloride, with diamines. This method is preferably used in such a manner that after the application of the solution of the dichloride onto the formed body, the solvent is at first evaporated and the reaction with the diamine is then brought about, either in solution or in the gaseous phase. In this manner it is possible to even use those polyamides as the second polymer which either are insoluble in practically all common solvents on account of their high crystallinity or are soluble only in such solvents as would attack the first polymer.

Certain aliphatic polyamides can also be produced in an analogous manner in situ on the formed body, e.g., those based on oxalic acid (polyoxamides). In the case of polyoxamides the acid chloride is generally not used for the reaction with the diamine, but rather a diester of oxalic acid such as n-butyloxalate is used. This reaction and the catalysts which can be used for it (e.g., antimony trifluoride or arsenic trioxide) are described in the literature. See R. Vieweg, A. Muller, publishers *Plastics Manual*, vol. VI, *Polyamide*, Carl Hanser Verlag Munich, pp. 146–148 (1966).

A further possibility for the in situ formation of polyamides is offered by the reaction between diisocyanates and dicarboxylic acids, in which the polyamide formation takes place under the splitting off of carbon dioxide. Diisocyanates also constitute initiators for the in situ formation of polyurethanes and polyureas on the formed body.

The following are primarily suited for the application from the gaseous phase on account of their relatively high vapor pressure: low-molecular weight diisocyanates such as 1,4-butane diisocyanates; 1,6-hexane diisocyanate; p-phenylene diisocyanate; 2,4- ,2,5- and 2,6-toluylene diisocyanates; 1,5-naphthylene diisocyanate; and 4,4-diphenylmethane diisocyanate.

Difficulty volatile, higher molecular weight diisocyanates obtained by the conversion of glycols with an excess of low molecular weight diisocyanates can also be considered for the in situ formation of polyamides, polyurethanes and polyureas. These products are described in the literature. See *Ullmann's Encyclopedia of Industrial Chemistry*, Vol. 14, pages 346–347. The glycols used exhibit rather long chains with recurring ether or ester bonds. According to the invention the former are preferred on account of their higher resistance to hydrolysis. These higher molecular weight diisocyanates (prepolymers) are applied in accordance with the invention from an inert, anhydrous solvent, e.g., a ketone and the concentration of the prepolymer is from 0.1 to 5%, preferably 0.5 to 2%. It is of course also possible to apply readily volatile diisocyanates from solution; however, in this instance the gaseous phase is preferred because the evaporation of the solvent is then eliminated.

The in situ formation of polyurethanes can also take place in that the diisocyanate component is applied in common with the glycol component from solution because the relatively low reactivity of the hydroxyl group results in sufficiently long pot lives of the coating solution. On the other hand, in the in situ formation of polyamides from diisocyanates and dicarboxylic acids or polyureas from diisocyanates and amines, ammonia or water, this is generally not possible on account of the prematurely occurring reaction and the two components must be applied in succession.

The partial pressure of the precursor in the gaseous phase can be adjusted by saturating the atmosphere at a certain temperature. In the case of low molecular weight diisocyanates this temperature is between room temperature and approximately 20° C. below the boiling point of the diisocyanate, preferably between 50° and 100° C. The dwell time can be between 30 seconds and 60 minutes; a range of 2 to 10 minutes is more preferable.

Halogenation of the Second Polymer

As already explained, the grafting in the first of the two preferred grafting methods takes place on the halogenated nitrogen of the second polymer. Insofar as the latter is therefore not applied in an already halogenated form, it must be converted partially or entirely into the N-halogen derivative before the grafting. Inorganic and organic chlorine and bromine compounds wherein the halogen has a +1 valence are suitable as halogenation agents. Inorganic halogenation agents are the hypochlorite ion and hypobromite ion and hypochlorous or hypobromous acid in equilibrium with them in accordance with the pH. The organic chlorinating agents include t-butylhypochlorite, which is used in an organic solvent, as well as organic N-chlorine compounds such as chloramine T or dichloroisocyanuric acid, which are used in aqueous solution. The two last-named chlorinating agents are especially preferred on account of their resistance to storage and their low cost.

The preferred pH range in the chlorination step is between 5 and 7, with values around 6 being especially preferred. In the case of chloramine T a value of 6.3 appears to be especially advantageous because the water solubility of the product drops off sharply below that pH value. The preferred concentration range for chloramine T is between 0 1 and 3% with values between 1 and 2% being especially preferred.

The chlorinating times with chloramine T can be between 2 seconds and 10 minutes, preferably between 30 and 60 seconds. With inorganic hypochlorites the preferred concentrations are about 0.05 to 3% active chlorine, with the range of 0.1 to 0.5% being preferred. The chlorinating times are about 30 seconds to 5 minutes,-preferably about 1 to 2 minutes.

In a special variant of the method the halogenation takes place with hypobromite generated in situ by exposing the formed body to be coated with the nitrogen-containing polymer in succession to an atmosphere of bromine and one of ammonia.

After the chlorination of the second polymer it is advantageous to remove the excess chlorinating agent by rinsing because there is otherwise the danger of homopolymerization in the grafting medium. Moreover, in the case of porous formed bodies, except in the case of ultrafiltration membranes, it is advantageous to dry the formed body before contacting it with the grafting medium in order to accelerate imbibition of the latter into the pores.

The removal of residual halogen content from the surface of the grafted formed body after the grafting has been carried out is possible in principle with the same reducing agents which have been used in the grafting. In addition, sodium borohydride or sodium hydrogen sulfite can also be used. The concentrations to be used are not critical and can therefore be selected to be relatively high in order to accelerate the reaction.

Selection of the Monomers

Singly or multiply ethylenically unsaturated monomers are suitable for the use of the invention insofar as they exhibit a solubility, even if slight, in primarily aqueous systems. The term "primarily aqueous systems" denotes aqueous systems which, aside from the monomer, contain either no further organic component or a water-miscible solvent in a concentration which does not reach the degree which results in a complete precipitation of sodium dithionite. In the case of acetone as solvent the portion can be, e.g., up to 40% by weight. When using monomers with low water solubility such as glycidyl methacrylate, it can also be added to the grafting liquor in emulsified form.

The selection of the monomer naturally depends on the type of surface modification which is to be achieved by using the method of the invention.

If a wettability of the formed body is to be achieved by the grafting, which is particularly desirable in the case of microporous membranes of hydrophobic polymers such as PVDF or polysulfone for filtration purposes, all hydrophilic monomers including the ionic ones can be used. Ionic monomers are used for the production of formed bodies intended for use as ion exchangers. Of this group, the following are suitable: unsaturated carboxylic acids such as acrylic and methacrylic acid; N-acrylamidoglycolic acid; trimethylammonium-2-hydroxypropyl-methacrylate chloride; dimethylaminoethylmethacrylate; diethylaminoethylmethacrylate; sulfopropylmethacrylate; 2-acrylamido-2-methylpropane sulfonic acid (AMPS); dimethylaminopropylmethacrylamide; methacrylamidopropyl trimethylammonium chloride; N-morphololinopropylmethacrylamide; 4-vinyl pyridine; N-vinyl imidazol; and triethylammonium-2-hydroxypropylmethacrylate chloride.

If the adsorption capacity for proteins is to be reduced by the modification, primarily non-ionic, hydrophilic monomers are possibilities. These are usually monomers containing one or several hydroxyl groups. Monomers containing hydroxyl groups are also suitable for subsequent conversion, e.g., the binding of ligands for affinity chromatography. Suitable non-ionic, hydrophilic monomers are vinyl pyrrolidone, hydroxyethylmethacrylate and acrylate, hydroxypropylmethacrylate and acrylate, dihydroxyproplymethacrylate (glycerol methacrylate) and acrylate, diethylene glycolmethacrylate, octaethylene glycolmethacrylate, acryl-and methacrylamide, N-(tris-hydroxymethyl)-methylmethacrylamide and acrylamide, N-hydroxyethylmethacrylamide and vinyl acetate (with subsequent saponification to grafted polyvinyl alcohol).

A preferred monomer free of hydroxyl groups for the hydrophilic adsorption-reducing modification is morpholinoethyl-methacrylate, which does display a weakly cationic character but nevertheless exhibits no tendency to adsorb proteins according to an ionic mechanism. Thus, even the adsorption of serum albumin, which exhibits an isoelectric point of 4.6, is surprisingly sharply reduced at a pH of 7 even though the protein is present under these conditions as anion and therefore actually an increased ionic bonding to a cationic surface is expected.

The "reactive" monomers are also suitable for various further conversions. These are monomers which can be brought to a reaction under especially mild conditions, e.g., with primary amino groups. They are therefore especially suited for subsequent conversions such as the chemical binding of proteins, e.g., as affinity ligands. Suitable representatives of reactive monomers are, e.g., glycidyl methacrylate and acrylate, methacrylamidoglycolate methyl ether, acrolein and methacrolein.

A reactive monomer which can be used in a particularly versatile manner in the method of the invention is glycidyl methacrylate because it is capable of many further conversions on account of its epoxide group. Thus, the conversion with sodium sulfite results, upon introduction of the sulfo group, in a strongly acidic ion exchanger, while the reaction with imino diacetic acid, upon introduction of the imino diacetate group, results in a chelate exchanger. Both reactions are preferably carried out in the presence of a phase transfer catalyst, e.g., tetra-n-butylammonium bisulfate. The production of a strongly basic ion exchanger can take place by means of quaternization with a tertiary amine, with trimethyl amine being preferred due to its special reactivity. For the production of a weakly basic ion exchanger, the reaction is carried out with a secondary amine, in which instance diethyl amine is preferred due to the similarity of the product produced with the DEAE group, which is widely used in ion exchange chromatography.

Other suitable monomers are methyl acrylate and methacrylate, ethyl acrylate and methacrylate, methylvinyl acetamide, as well as the multiply ethylenically unsaturated monomers pentaerythrite dimethacrylate, glycerol dimethacrylate, tetraethylene glycol dimethacrylate, tetraethylene glycol diacrylate, methylene bisacrylamide, trimethylolpropane trimethacrylate and acrylate, glycerol trimethacrylate and acrylate as well as glycerol diacrylate. Such monomers can be used alone or in a mixture. In particular, it is possible to use singly and multiply ethlenically unsaturated monomers in combination, which achieves the grafting on of a cross-linked polymer. However, multiply ethylenically unsaturated monomers can also be used alone.

Increasing Wettability and Reducing Protein Adsorption

The contact angle of a liquid with the surface of a formed body can be used as a criterion for the wettability of the formed body, with a contact angle of <90° being regarded as "wettable". In the case of porous formed bodies, wettability signifies that the liquid penetrates into the pores upon contact with the porous formed body by itself, that is, without external use of pressure. On the other hand, if the contact angle is >90° a certain excess pressure of the liquid is necessary for this (intrusion pressure). Most of the eligible first polymers for the production of the formed bodies of the invention exhibit a contact angle of >90° for water and other liquids with a high surface tension, which causes problems, e.g., when they are used as filtration media.

When grafting the above-mentioned ionic and non-ionic hydrophilic monomers in accordance with the method of the invention, the contact angle of the formed body is generally reduced to <90° relative to water independently of the type of the first polymer and the formed body therefore becomes wettable with water. In the extreme instance a reduction of contact angle to 0° takes place, which corresponds to complete wettability. Frequently, wettability is also achieved by means of liquids with a surface tension even greater than that of water, e.g., by means of aqueous electrolytic solutions. When grafting, e.g., hydroxyethylmethacrylate, the grafted formed body in accordance with the invention can also be wetted by a saturated aqueous solution of common salt.

As to the effect on protein adsorption, there is a considerable difference between the ionic and the non-ionic hydrophilic monomers. Whereas the former obviously can bring about both a reduction and an increase of the adsorption of protein as a function of the charge of the monomer, the pH of the medium and the isoelectric point of the protein, a general reduction of protein adsorption is characteristic of the latter.

The extent to which the adsorption of protein is reduced depends on the type of protein, the type of the non-ionic hydrophilic monomer and frequently also on the degree of grafting, and the maximum reduction of adsorption with complete coating of the surface is achieved with the third polymer. According to the invention a reduction of adsorption to 0.1 to 50% of the initial value of the non-modified formed body is achieved and a decision can be made in the specific case as to which value is actually sought. This question is primarily significant in the case of especially fine-pored formed bodies because in this case the thickness of the layers applied by the modification can reach the magnitude of the pore diameter and can thus adversely effect the hydraulic permeability of the porous formed body. In these instances, therefore, the interplay between the reduction of the adsorption of protein and the hydraulic permeability should always be considered and it must be decided in the specific case which parameter has the greater significance for the intended use of the formed body. It can be indicated as an approximate value that even in the case of fine-pored formed bodies such as microporous membranes with a nominal pore size of 0.2 µm, a reduction of protein adsorption to 1 to 10% of its initial value for the unmodified membrane is achieved without the hydraulic permeability being decisively reduced.

Grafting of the Third Layer

In both preferred grafting methods the grafting takes place in the presence of a reducing agent in essentially aqueous solution. The monomer concentration in the grafting liquor can fluctuate within broad limits, namely between 0.1 and 50%, depending on the reactivity of the monomer and the degree of grafting sought, with the preferred range being between 0.5 and 10%.

Technically speaking, the grafting can basically be carried out either by an immersion method wherein the formed body is immersed in the grafting liquor during grafting, or by an impregnation method, which is especially preferred in the case of porous formed bodies. In the latter case the formed body is wetted with the grafting liquor and the grafting takes place subsequently in an atmosphere of inert gas, preferably under nitrogen. In the case of porous web materials such as microporous membranes the wetting with the grafting liquor can take place in a continuous manner, e.g., with a slotted nozzle or a foulard or by simple immersion.

The preferred reducing agent for the application of the method of the invention is sodium dithionite as well as its daughter products such as Rongalite. Other reducing agents such as hydrazine or ascorbic acid, the latter in the alkaline range, can also be used.

A further suitable reducing agent system is described in the literature in conjunction with redoxinitiated polymerizations (R. W. Brown, et al. in 46 *Ind. Eng. Chem.* 1073 (1954)) and consists of a combination of EDTA-complexed $Fe^{2+}$ with Rongalite at approximately pH 10. Rongalite itself is largely ineffective at room temperature for the method of the invention but it is effective at temperatures above 40° to 50° C., at which it develops a sufficient redox potential.

When sodium dithionite is used as the reducing agent, a pH range of 5 to 10 is used, with the especially preferred range being between 7.5 and 8.5. The concentration of sodium dithionite can be between 0.005 and 1%, with the range between 0.01 and 0.2% being preferred. If a grafting bath is used for a rather long time, the redox potential can be determined potentiometrically during the grafting and maintained constant by dosing with sodium dithionite concentrate. Typical values for a suitable redox potential are between −100 and −700 mV, preferably between −300 and −500 mV. Furthermore, a constant pH is preferably maintained which can be achieved by means of an appropriately buffered grafting medium or by the addition of base.

Although no further additives, aside from the reducing agent and the monomer, are required for the grafting after halogenation of the second polymer in the grafting liquor, the presence of certain organic halogen compounds is required for the other method. The mechanism of this reaction is unexplained at the present. It is only known that an addition of carbon tetrachloride is effective even in very slight concentrations (e.g., in the saturation concentration in water, which is approximately 0.07%) whereas higher portions of 0.2 to 5%, preferably 0.5 to 2%, of the likewise effective trichloroacetic acid are required.

Aside from the addition to the grafting liquor, there are yet other advantageous possibilities of supply when using carbon tetrachloride as the organic halogen compound. It can be supplied to the formed body either before or during the grafting. It can be supplied before and during the grafting via an atmosphere saturated between 0° and 50° C. with carbon tetrachloride with which the formed body is brought in contact, or before grafting by means of impregnation with carbon tetrachloride and evaporation of the excess or impregnation with a solution of carbon tetrachloride with a concentration of 1 to 10% in a volatile solvent such as acetone, followed by evaporation of the solvent.

The grafting can be carried out by both methods at relatively low temperatures of approximately 0° to 50° C.; the range around room temperature makes the choice of equipment especially simple on account of the elimination of the requirement for heating and cooling. However, since the grafting can be carried out at temperatures of up to 100° C. and an elevation of temperature brings about an acceleration of the grafting, an especially preferred embodiment of the invention uses the impregnation method, wherein the impregnation takes place between 0° C. and room temperature and the grafting is subsequently performed in an atmosphere of inert gas with a temperature between room temperature and 100° C., preferably between 30° and 60° C. This method is especially advantageous because the grafting liquor is more stable at low temperatures, that is, has less of a tendency toward homopolymerization.

The grafting time and the monomer concentration depend primarily on the desired degree of grafting, which in turn depends upon the intended use of the grafted formed body as well as upon its specific surface. Practical grafting-time ranges are between 1 and 30 minutes if a continuous method is used, with the range between 3 and 10 minutes being preferred. If the grafting is performed batchwise, as is preferably done in the case of web material on a jigger, wherein the web may be guided repeatedly through the grafting liquor, grafting times of any desired length may be used. This is especially significant if either extremely high degrees of grafting are sought or if monomers with an extremely low grafting tendency are to be used. In the interest of an economical production an upper limit of grafting time of 2 hours appears to be appropriate and the lower limit is approximately 15 minutes. The preferred range is between 30 and 60 minutes. The method of operating without chlorination of the second polymer is better suited for a grafting over rather long time periods because no exhausting of the N-Cl groups can occur and the grafting cannot be halted prematurely as a result thereof.

Degree of Grafting

The term "degree of grafting" signifies the increase in mass on the third polymer during the grafting relative to the mass of the first polymer. It is a special characteristic of the method of the invention that the degree of grafting required to achieve a certain effect are approximately one order of magnitude lower than if the formed body consists entirely of the polymer accessible to the grafting, e.g., a polyamide. In addition to the advantages of the method of the invention already mentioned, this also results in a cost savings for the monomer.

A distinction should be made in the case of the degree of grafting to be sought between those modifications in which only certain surface properties such as the wettability or the adsorption capacity are to be changed and those in which a bonding capacity for certain substances is to be achieved such as in the case of ion exchangers or affinity membranes. In the first case only a coating of the surface by the third polymer is necessary but in the second case, as great a thickness layer as possible should be applied in order to assure as great a bonding capacity as possible by means of a large volume of adsorbent polymer. The uppermost limit is governed by the reduction in flux caused by the resulting pore constriction. Thus, in the first case the degree of grafting can be considerably lower than in the second case. A further point in evaluating degree of grafting is the surface area of the formed body; the greater the surface area, the higher the optimum degree of grafting will become.

Among the formed bodies, the fabrics, fleeces and microporous membranes especially intended for the method of the invention, the last-mentioned exhibit by far the largest surface area; the greater the surface area, the smaller the pore size, which can range between 0.05 and 15 µm.

It becomes understandable when taking these marginal conditions into consideration that the degree of grafting can be in the broad range between 0.1 and 50%; the upper limits are valid in the case of microporous membranes for use as adsorbents, that is, for membrane ion exchangers or affinity membranes and the lower limits, on the other hand, are valid for fabrics or fleeces which are modified hydrophilically and/or in an adsorption-reducing manner. The preferred range is between 0.5 and 10%.

It is especially surprising in the grafting methods preferred in accordance with the invention that the mass of the second polymer relative to the first polymer can be very small; even in the case of microporous membranes exhibiting an especially high surface area, the mass of the second relative to that of the first may be 0.01 to 10%, preferably 0.1 to 2%. For unknown reasons, the necessary mass of the second polymer depends upon the type of the first polymer. It is considerably lower for example in the case of cellulose hydrate than in the case of polyethersulfone. The mass of the third polymer relative to that of the second polymer can fluctuate within broad ranges, i.e., between 50 and 5000%, and the portion of the third polymer can therefore exceed that of the second by far.

The following examples further illustrate the invention.

EXAMPLE 1

A coating solution with the following composition was produced:

5% nylon 8 T-8-E (from Unitica Co., Ltd, a methoxymethylated nylon 6 with a degree of methoxymethylation of 30%)

0.1% citric acid

Remainder ethanol/water 3/1 (parts by volume).

Weighed microporous membranes with a nominal pore size of 0.45 µm and a diameter of 50 mm were impregnated with the solution by immersion, the excess solution removed, and the solvent evaporated with an electric hot-air device. The specimens were then heated 15 minutes in a drying oven to 140° C. and washed with 3/1 ethanol/water, dried at 60° C., weighed and grafted 10 minutes at room temperature in a grafting solution having the following composition:

5% glycidyl methacrylate, emulsified with 0.3% Araltone-G (Atlas)

0.1% sodium dithionite

1% carbon tetrachloride (as excess solute)

Remainder 0.15 M phosphate buffer pH 8.

After the grafting, the specimens were rinsed 10 minutes under running water and twice with acetone, dried 15 minutes at 60° C. and weighed. A sulfonation in an aqueous solution with the following composition was then carried out over a period of 30 minutes at 95° C.:

20% sodium sulfite

5% tetra-n-butyl ammonium bisulfate

5% sodium phosphate dihydrate adjusted with sodium hydroxide solution to pH 8.

After rinsing and drying as above, the bonding capacity of the resulting strongly acidic membrane ion exchanger was determined with Cytochrome C by filtering a 0.1% solution of the test protein at a pressure of 1 bar until the breakthrough of the protein through the membrane. The protein content of the filtrate was determined photometrically at 550 nm. The treated membranes were PVDF (Durapore® hydrophobic polyvinylidene fluoride from Millipore) and CH (SM 11606 cellulose hydrate membrane from Sartorius AG).

The weight increases and flowthrough rates relative to the untreated initial membranes were as noted in the tables below.

| Type Membrane | Weight Increase (%) | | Bonding Capacity for Cytochrome C (µg/cm$^2$) |
|---|---|---|---|
| | After Nylon 8 Treatment | After Grafting | |
| PVDF | 10 | 12 | 568 |
| CH | 11 | 15 | 380 |

| Type Membrane | Flowthrough rate (ml/cm$^2$ · min · bar) | | |
|---|---|---|---|
| | Before Treatment | After Grafting | After Sulfonation |
| PVDF | 38 | 11.3 | 3.1 |
| CH | 40 | 10 | 9.7 |

EXAMPLE 2

A hydrophobic PVDF membrane was coated and grafted as in Example 1 but instead of glycidyl methacrylate and the emulsifier, 3% morpholinoethylmethacrylate was in the grafting solution. The grafted membranes were agitated 3 hours in a 0.1% solution of gamma-globulin in 10 mM phosphate buffer pH 7 at room temperature. A determination of the adsorbed protein was made after rinsing with the same buffer according to the BCA method (Pierce). The weight increase during the grafting was 1.3%.

The gamma-globulin adsorption dropped during the grafting from 118 µg/cm$^2$ to 5 µg/cm$^2$, the flowthrough rate remained unchanged at 40 ml/cm$_2$·min•bar and the specimen was spontaneously wettable with water, in contrast to the hydrophobic initial material.

EXAMPLE 3

A PVDF membrane was impregnated with a solution with the following composition:

2.5% polyol PU 704 (Wevo)

1.0% diisocyanate hardener 700 (Wevo)

Remainder methylethyl ketone.

After drying as in Example 1, the polyurethane was hardened 10 minutes at 100° C. in a drying oven. The grafting took place as in Example 1 but with the exception that 1% glycerol methacrylate was added. The remainder of the treatment was identical to that set forth in Example 1. The weight increase during the coating with polyurethane was 6.7%, and during the grafting 7.2%, while the flowthrough rate after sulfonation 10.6 ml/cm$_2$·min·bar, and the bonding capacity for Cytochrome C was 7599 µg/cm$^2$.

EXAMPLE 4

Cellulose hydrate membranes with a pore size of 5 µm from N-chlorinated nylon 66 were immersed into methylene chloride solutions of different concentrations and dried 7 minutes in a drying oven at 80° C. They were then grafted as in Example 1 with glycidyl methacrylate, sulfonated, and the protein binding capacity determined. The results are set forth in the table below.

| Coating Concentration (%) | 0.001 | 0.01 | 0.1 |
|---|---|---|---|
| Grafting Time (min.) | 10 | 5 | 7 |
| Degree or Grafting (%) | 2 | 4 | 11 |
| Cytochrome C Capacity (µg/cm$^2$) | 660 | 1750 | 1080 |
| Flowthrough (ml/cm$^2$ · min · bar) | 54 | 140 | 51 |

EXAMPLE 5

PVDF microfilters with a nominal pore diameter of 0.45 µm (Millipore, type HVHP) were coated with a solution of 0.3% N-Cl nylon 66 in 6/1 methylene chloride/methanol (parts by volume) as in Example 4. The filters were then pre-wetted in methanol, rinsed with deionized water and grafted 15 minutes in solutions of the following composition, followed by rinsing and drying as in Example 1.

3% monomer 0.01% sodium dithionite

Remainder 0.15 M phosphate buffer pH 7.5

The following measured values were obtained when using the two monomers hydroxyethylmethacrylate (A) and morpholinoethylmethacrylate (B) (protein adsorption=adsorption of gamma-globulin, determined as in Example 2):

| Monomer | A | B |
|---|---|---|
| Degree of Grafting (%) | 8 | 2.4 |
| Protein Adsorption (µg/cm$^2$) | 10.8 | 2.3 |

Both specimens wetted spontaneously with water, in contrast to the ungrafted initial membrane.

EXAMPLE 6

Polyethersulfone microfilters with a protein adsorption of 95 µg/cm$^2$ were coated with a 0.2% solution of N-Cl nylon 66 in formic acid and dried as in Example 4. Grafting was then performed for 5 minutes in the following solution:

3% hydroxyethylmethacrylate 0.1% sodium dithionite

Remainder 0.15 M phosphate buffer pH 7.5

The degree of grafting was 8%, while the protein adsorption 9 µg/cm$^2$. The low protein adsorption remained undisturbed even after exposure to acids and bases, as noted below (rt=room temperature):

| PROTEIN ADSORPTION (µg/cm$^2$) | | |
|---|---|---|
| Exposure | Exposure Time | |
| Conditions | 1 day | 6 days |
| 5 N NaOH at rt | 8 | 10 |
| 1 N NaOH at 50° C. | 11 | 13 |
| 2 N H$_2$SO$_4$ at rt | 7 | 6 |
| 1 N H$_2$SO$_4$ at 50° C. | 12 | * |

*not recorded

EXAMPLE 7

Polyethersulfone microfilters (0.65 µm nominal pore size) were coated with solutions of N-Cl nylon 66 of various concentrations in formic acid, dried in the manner described above, grafted in a grafting liquor consisting of 2% glycidyl methacrylate emulsified with 0.05% Arlatone-G (Atlas), in 0.15 M phosphate buffer pH 7.5 with 0.02% sodium dithionite and treated further, sulfonated and the binding capacity for Cytochrome C tested as described above. The following results were obtained.

| Coating Conc. (%) | Grafting Time (min) | Degree of Grafting (%) | Cyto-C Bonding (µg/cm$^2$) | Flowthrough Rate (ml/cm$^2$ · min · bar) |
|---|---|---|---|---|
| 0.02 | 15 | 4 | 300 | 77 |
| 0.05 | 15 | 6 | 420 | 53 |
| 0.1 | 3 | 6 | 580 | 52 |
| 0.5 | 2 | 4 | 120 | 108 |
| 2.0 | 1 | 6 | 96 | 94 |

EXAMPLE 8

Polyethersulfone microfilters with a nominal pore size of 0.2 =m were coated with a 0.2% solution of N-Cl nylon 66 in formic acid, dried and subsequently grafted for 15 minutes at different temperatures. The grafting solution consisted in all instances of 3% hydroxyethylmethacrylate and 0.01% sodium dithionite in 0.15 M phosphate buffer pH 7.5. The results are shown below.

| Grafting Temperature | Degree of Grafting (%) |
|---|---|
| 20° C. | 8.3 |
| 30° C. | 26.0 |
| 40° C. | 48.3 |

EXAMPLE 9

A polyethersulfone ultrafilter was rinsed with formic acid, fastened under a glass plate with the "skinned" layer down and coated with a 0.2% solution of N-Cl nylon 66 in 3/1 formic acid/glycerol (parts by volume) by a rubber roller. The filter was then briefly immersed in formic acid and preserved in water until grafting. The grafting took place for 5 minutes in a solution of 3% 2-(N-morpholino)ethylmethacrylate and 0.1% sodium dithionite in 0.15 M phosphate buffer pH 7.5. The degree of grafting was 1.5%. After filtration of a 0.1% Cytochrome C solution the membrane was distinctly less colored than a non-grafted reference membrane, evidencing a reduction of protein adsorption.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method of grafting polymerized components onto the surface of a polymeric microporous support membrane comprising the following steps:
    (a) providing a polymeric microporous support membrane;
    (b) forming a coated support membrane by coating said support membrane with a coating comprising an N-halogenated compound selected from an N-halogenated polymer and an N-halogenated polymeric precursor; and
    (c) grafting said coating to said coated support membrane by contacting the same with an ethylenically unsaturated monomer and sodium dithionite in a primarily aqueous solution.

2. A method of grafting polymerized components onto the surface of a polymeric microporous support membrane comprising the following steps:
    (a) providing a polymeric microporous support membrane;
    (b) forming a coated support membrane by coating said support membrane with a coating comprising an N-containing compound selected from an N-containing polymer and an N-containing polymeric precursor wherein said N has bonded thereto at least one hydrogen atom substitutable by halogen; and
    (c) grafting said coating to said coated support membrane by contacting the same with an ethylenically unsaturated monomer and sodium dithionite in a primarily aqueous solution that contains an organic halogen compound selected from carbon tetrachloride and trichloroacetic acid.

3. The method of claim 1 or 2 wherein said ethyenically unsaturated monomer is selected from the group consisting of
    Methylmethacrylate,
    Ethylmethacrylate,
    Hydroxyethylmethacrylate,
    Methacrylamidoglycolate methylether,
    Glycerol methacrylate,
    Glycidyl methacrylate,
    Glycerol acrylate,
    Glycidyl acrylate,
    Diethylaminoethylmethacrylate,
    Dimethylaminoethylmethacrylate,
    Sulfopropylmethacrylate,
    N-morpholinopropylmethacrylamide,
    N-morpholinoethylmethacrylate,
    Dimethylaminopropylmethacrylamide,
    Vinyl pyrrolidone,
    N-hydroexyethylmethacrylamide,
    N-acrylamidoglycolic acid,
    N-[tris-(hydroxymethyl)]-methylmethacrylamide,
    N-[tris-(hydroxymethyl)]-methylacrylamide,
    Methacrylamide,
    2-acrylamino-2-methyl-propane sulfonic acid,
    Triethylammonium-2-hydroxypropylmethacrylate chloride,
    Methacrylamidopropyltrimethylammonium chloride,
    Diethylaminoethylmethcrylate,
    Diethylene glycol methacrylate,
    Methacrylate,
    Ethylacrylate,
    Hydroxypropylmethacrylate,
    Hydroxyethylacrylate,
    Hydroxypropylacrylate,
    Acrylamide,
    Vinyl acetate,
    Octaethylene glycol methacrylate,
    Vinyl imidazol,
    Methylvinyl acetamide,
    4-vinyl pyridine,
    Acrolein and
    Methacrolein.

4. The method of claim 1 or 2 wherein said ethylenically unsaturated monomer is selected from the group consisting of:
    Pentaerythrite dimethacrylate,
    Glycerol dimethacrylate,
    Glycerol diacrylate,
    Glycerol trimethacrylate,
    Glycerol triacrylate,
    Tetraethylene glycol dimethacrylate,
    Tetraethylene glycol diacrylate,
    Trimethylol propane triacrylate,
    Trimethylol propane trimethacrylate and
    Methylene bisacrylamide.

5. The method of claim 1 or 2 wherein said coating on said coated support membrane is formed in situ.

6. The method of claim 1 or 2 wherein said coating on said coated support membrane is cross-linked.

7. The method of claim 1 or 2 wherein said coating on said coated support membrane is selected from polyamides, polysulfonamides, polyurethanes, polyureas, and monomeric precursors of the same.

8. The method of claim 7 wherein said coating is a polyamide selected from an N-hydroxymethylated and an N-methoxymethylated polyamide.

9. The method of claim 7 wherein said coating is a polyurea formed by a reaction between a diamine and a diisocyanate.

10. The method of claim 1 or 2 wherein said polymeric microporous support membrane is selected from the group consisting of cellulose, cellulose acetate, cellulose hydrate, cellulose nitrate, polysulfones, polyether sulfones, polyolefins, halogenated polyolefins, polyesters and homo- or copolymers of acrylonitrile.

11. The product of the process of claim 1 or 2.

12. The product of claim 11 wherein said ethylenically unsaturated monomer is glycidyl methacrylate.

13. The product of claim 12 wherein, following step (c), the resulting membrane product is post-treated by a method selected from:
 (a) sulfonation of epoxide groups of said glycidyl methacrylate by treatment with sulfite ions;
 (b) quaternization of epoxide groups of said glycidyl methacrylate by treatment with a tertiary amine; and
 (c) formation of a tertiary amino group by conversion of epoxide groups of said glycidyl methacrylate with a secondary amine.

* * * * *

UNITED STATES PATENT AND TRADEMARK OFFICE
CERTIFICATE OF CORRECTION

PATENT NO. : 5,547,575

DATED : August 20, 1996

INVENTOR(S) : Demmer, Hörl, Nussbaumer, Weiss and Wünn

It is certified that error appears in the above-indentified patent and that said Letters Patent is hereby corrected as shown below:

On the title page: Item [54] and Column 1, line 1,

Change the title to read "METHOD OF GRAFTING UNSATURATED MONOMERS TO POLYMERIC MEMBRANES"

Col. 3, line 33: change "may" and insert -- many --

Col. 6, line 3: insert -- to -- before " 5 minutes"

Col. 8, line 19: insert -- . -- between "0" and "1"

Col. 10, line 67: change "effect" to -- affect --

UNITED STATES PATENT AND TRADEMARK OFFICE
CERTIFICATE OF CORRECTION

PATENT NO. : 5,547,575

DATED : August 20, 1996

INVENTOR(S) : Demmer, Hörl, Nussbaumer, Weiss and Wünn

It is certified that error appears in the above-indentified patent and that said Letters Patent is hereby corrected as shown below:

Col. 14, line 58: change "$cm_2$" to -- $cm^2$ --

Col. 15, line 9: change "$cm_2$" to -- $cm^2$ --

Col. 15, ≈line 56 (last figure in right column): change "2.3" to -- 12.3 --

Col. 16, line 47: change "=m" to -- $\mu m$ --

Signed and Sealed this

Twenty-first Day of July, 1998

Attest:

Attesting Officer

BRUCE LEHMAN

Commissioner of Patents and Trademarks